(12) United States Patent
Spracklen et al.

(10) Patent No.: US 10,540,155 B1
(45) Date of Patent: Jan. 21, 2020

(54) PLATFORM-AGNOSTIC PREDICTIVE MODELS BASED ON DATABASE MANAGEMENT SYSTEM INSTRUCTIONS

(71) Applicant: TIBCO Software Inc., Palo Alto, CA (US)

(72) Inventors: Lawrence Spracklen, San Francisco, CA (US); Steven Hillion, San Francisco, CA (US); Michael Thyen, San Francisco, CA (US)

(73) Assignee: TIBCO SOFTWARE INC., Palo Alto, CA (US)

( * ) Notice: Subject to any disclaimer, the term of this patent is extended or adjusted under 35 U.S.C. 154(b) by 0 days.

(21) Appl. No.: 15/674,861

(22) Filed: Aug. 11, 2017

Related U.S. Application Data

(60) Provisional application No. 62/373,700, filed on Aug. 11, 2016.

(51) Int. Cl.
*G06F 8/41* (2018.01)
*G06F 11/30* (2006.01)
(Continued)

(52) U.S. Cl.
CPC .............. *G06F 8/443* (2013.01); *G06F 8/35* (2013.01); *G06F 9/448* (2018.02); *G06F 11/302* (2013.01); *G06F 2201/865* (2013.01)

(58) Field of Classification Search
CPC . G06F 8/443; G06F 9/448; G06F 8/35; G06F 9/4421; G06F 11/302; G06F 2201/865
(Continued)

(56) References Cited

U.S. PATENT DOCUMENTS

| 8,185,486 B2 * | 5/2012 | Eder | G06Q 40/00 |
| | | | 706/45 |
| 2010/0185645 A1 * | 7/2010 | Pazdziora | G06F 17/30389 |
| | | | 707/760 |

(Continued)

OTHER PUBLICATIONS

Das et al, "Massively Parallel In-Database Predictions using PMML", [Online], 2011, pp. 22-27, [Retrieved from internet on Sep. 5, 2019], <http://delivery.acm.org/10.1145/2030000/2023601/p22-das.pdf> (Year: 2011).*

(Continued)

*Primary Examiner* — S. Sough
*Assistant Examiner* — Zengpu Wei
(74) *Attorney, Agent, or Firm* — McGuireWoods LLP

(57) ABSTRACT

Platform-agnostic predictive models based on database management system instructions are described. A system identifies a representation of data transformations associated with a first predictive model that executes on a first computing platform. The system parses the representation of data transformations. The system generates database management system instructions that correspond to the parsed representation of data transformations. The system sends the database management system instructions to a second predictive model that executes on a second computing platform, thereby enabling the second predictive model to execute at least some of the database management system instructions to generate a prediction. The first computing platform and the second computing platform are different types of computing platforms.

17 Claims, 3 Drawing Sheets

(51) Int. Cl.
*G06F 8/35* (2018.01)
*G06F 9/448* (2018.01)

(58) Field of Classification Search
USPC .......................................................... 717/153
See application file for complete search history.

(56) References Cited

U.S. PATENT DOCUMENTS

| | | | |
|---|---|---|---|
| 2015/0293755 A1* | 10/2015 | Robins ................ | G06F 9/44526 717/104 |
| 2016/0092520 A1* | 3/2016 | Srivastava ............ | G06Q 30/06 707/722 |
| 2017/0017635 A1* | 1/2017 | Leliwa ................. | G06F 17/271 |
| 2017/0132280 A1* | 5/2017 | Li ....................... | G06F 17/30448 |
| 2017/0315791 A1* | 11/2017 | Mascaro .................. | G06F 8/51 |
| 2017/0364590 A1* | 12/2017 | Hill ................... | G06F 17/30864 |
| 2018/0032605 A1* | 2/2018 | Deshpande ....... | G06F 17/30696 |

OTHER PUBLICATIONS

Makhtar et al, "Predictive Model Representation and Comparison: Towards Data and Predictive Models Governance", [Online], 2010, pp. 1-6, [Retrieved from internet on Sep. 5, 2019], <https://ieeexplore.ieee.org/stamp/stamp.jsp?tp=&arnurnber=5625573> ( Year: 2010).*
Bellazzi et al, "Predictive data mining in clinical medicine: Current issues and guidelines", [Online], 2008, pp. 81-97, [Retrieved from internet on Sep. 5, 2019], <http://eprints.fri.uni-lj.si/994/1/2008-IJMI-BellazziZupan.pdf> (Year: 2008).*

* cited by examiner

PLATFORM-AGNOSTIC PREDICTIVE MODELS BASED ON DATABASE MANAGEMENT SYSTEM INSTRUCTIONS

CLAIM OF PRIORITY

This application claims the benefit of U.S. Provisional Patent Application No. 62/373,700, filed Aug. 11, 2016, the entire contents of which are incorporated herein by reference.

BACKGROUND

Predictive analytics can be a variety of statistical techniques, including predictive modeling, machine learning, and data mining, which analyze current and historical facts to generate predictions about future, or otherwise unknown, events. In business, predictive models detect patterns in historical and transactional data to identify risks and opportunities. Data scientists use predictive models to capture the relationships among a data set's many factors, which enables the assessment of risk or potential associated with a particular set of conditions, and guides decision making for candidate transactions. A predictive model can generate a predictive score (probability) for each individual (customer, employee, healthcare patient, product stock keeping unit, vehicle, component, machine, or other organizational unit) in order to determine, inform, or influence organizational processes that pertain across large numbers of individuals, such as in marketing, credit risk assessment, fraud detection, manufacturing, healthcare, and government operations. A predictive model can be a system that estimates a consequence for something.

Production engineers lack turn-key solutions for operationalizing the results of predictive analytics. Often, the results of a predictive analytics project are created in a training system and then communicated via an email or a specification document, which is to be translated manually into a production system. These methods of communicating predictive analytics results leads to slow turnaround and errors, or in many cases leads to the broader enterprise never adopting insights from a predictive analytics project. One solution to this communication problem may be the exporting of predictive analytics results from a training environment's predictive model to a production environment's predictive model, which may be referred to as a scoring engine and may be deployed to generate predictions for production data sets, such as real-time data streams. However, in many instances, the training environment's computing platform is a completely different type of computing platform than the production environment's computing platform. A computing platform can be the environment in which a software application is executed. Therefore, a predictive model executed on one type of computing platform requires a standardized way to be exported to another type of computing platform that will support another version of the same predictive model, which may be referred to as a platform-agnostic predictive model. The most widely deployed predictive model specification language, which may be used as an interchange format for predictive models, may be the Predictive Model Markup Language (PMML). While the Predictive Model Markup Language is adept at specifying common predictive models, the Predictive Model Markup Language lacks the flexibility to specify the pre-processing of data and the post-processing of data that is required for many predictive models. This lack of flexibility can result in data scientists and/or production engineers manually augmenting a Predictive Model Markup Language file with their own computer executable instructions. To address this manual coding shortcoming, the Portable Format for Analytics (PFA) has been developed as a new interchange format standard for predictive models. The PFA can enable significantly more complex data processing to be described, thereby enabling the complex end-to-end data transformations of predictive models to be encapsulated in a single PFA file.

DETAILED DESCRIPTION

Figure 1:
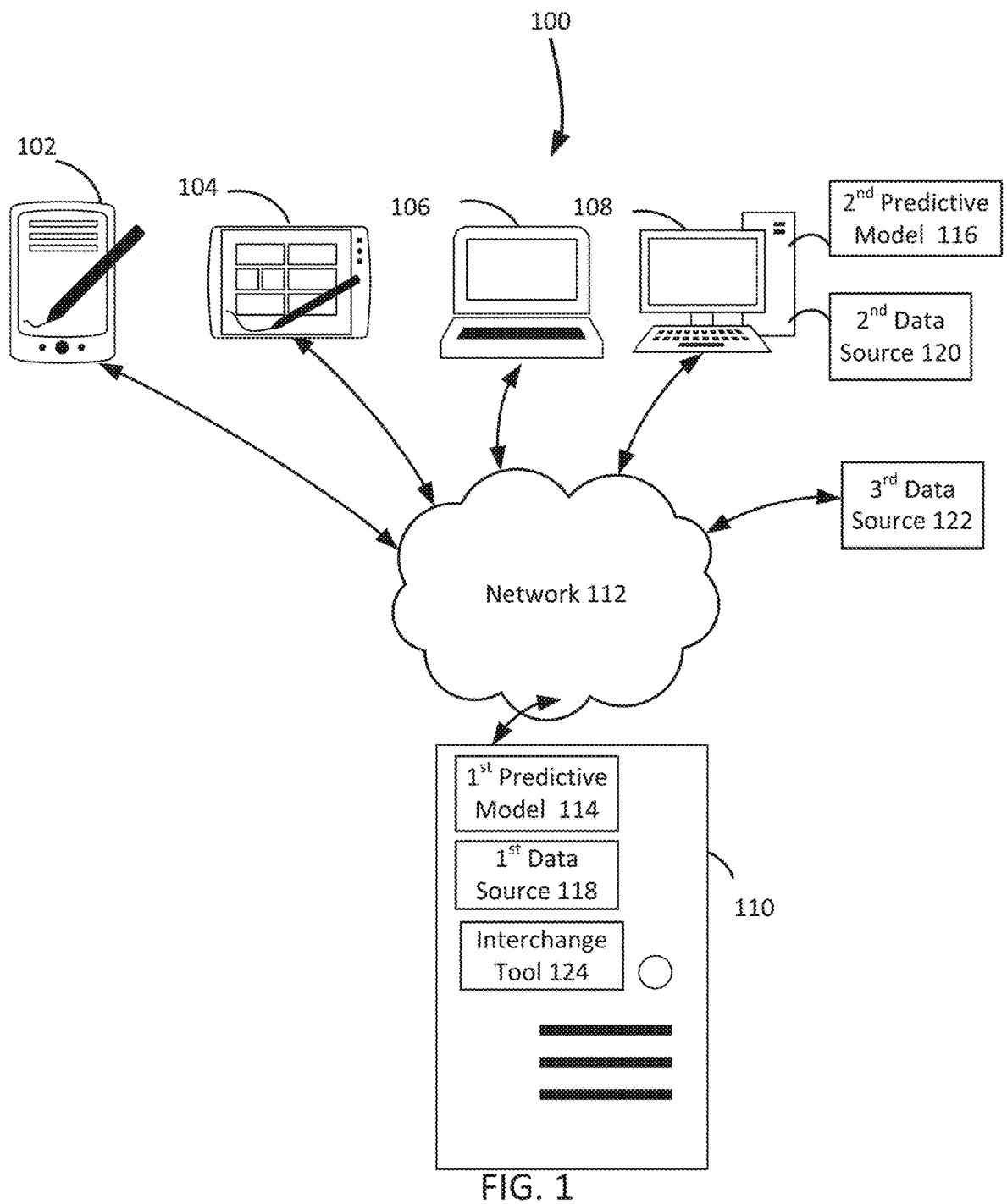
FIG. 1 illustrates a block diagram of an example system for platform-agnostic predictive models based on database management system instructions, under an embodiment.

The PFA suffers from some significant drawbacks. The PFA only supports platform-agnostic predictive models that have a single input and a single output, significantly limiting the scope of the Portable Format for Analytics. Since the PFA is a new standard, there is currently only limited support across the data science industry for either the creation or the consumption of predictive models based on the PFA. Although limited support is inevitable with the introduction of any new standard, this limited support represents a challenge for the use of PFA as an interchange format between different types of computing platforms for training and production. Furthermore, adding support for any new predictive model interchange format, such as the PFA, to an existing predictive analytics computing platform requires the enhancement of each operation supported on the predictive analytics computing platform to enable the export of its functionality via the new predictive model interchange format. Such an enhancement represents a significant development effort to modify every operation supported by an enterprise's predictive analytics frameworks, or computing platforms. In short, every platform where predictive models may be created or scored—commercial databases, analytics frameworks, open-source computation platforms—must be enhanced to support the new predictive model interchange format. Additionally, significant problems arise if an interchange format is insufficiently flexible to encode the full spectrum of supported operations, or cannot support the potentially complex interconnection of these operations that is required for a predictive model. The difficulties associated with any of these requirements rapidly begins to curtail the ease of using the PFA. Consequently, it may be impossible to export certain predictive models' data transformations due to the presence of certain operations, or their connectivity.

Ideally, once a predictive model is trained, the predictive model's data scientist(s) can create a companion "scoring flow" that defines the sequences of the transformations that need to be performed on data before, during, and after the application of the predictive model. Many of these data transformations mirror the manipulations of the data that were performed during training to maximize the predictive model's performance Therefore, once the correctness of the predictive model's sequence of data transformations has been thoroughly tested, it should then be feasible to encapsulate the entire sequence of data transformations in an exportable interchange format that may be deployed in a turn-key fashion on platform-agnostic predictive models.

A completely new model specification language may not be required. A survey of current enterprise predictive analytics reveals the continuing pervasiveness of the structured query language referred to as SQL. Even though the move to Hadoop® and MapReduce and other "big data" frameworks initially appeared to threaten the dominance of SQL, there has instead been a proliferation of SQL solutions on Hadoop®, including Hive, Impala, HAWQ® and Spark SQL. Indeed, SQL is still the language most commonly used by data scientists, and it has become the most common interface into the computing platforms where predictive analytics are deployed. The use of SQL as the basis for creating a predictive model interchange format can remove the need for the creation of any new predictive model interchange formats, such as the PFA. SQL is already supported on virtually every existing predictive analytics framework, ensuring the broadest possible deployment opportunities and removing the need to retrofit any existing solutions to support new predictive model interchange formats, such as the PFA. Additionally, SQL is sufficiently rich to encapsulate a predictive model's sequence of data transformations to be exported because a predictive model's sequence of data transformations is typically created using SQL, and because SQL has been the primary method of doing data transformations for several decades. Although examples describe the database management system instructions as SQL code, any type of database management system instructions could be used.

Embodiments herein enable platform-agnostic predictive models based on database management system instructions. A system identifies a representation of data transformations associated with a first predictive model that executes on a first computing platform. The system parses the representation of data transformations. The system generates database management system instructions that correspond to the parsed representation of data transformations. The system sends the database management system instructions to a second predictive model that executes on a second computing platform, thereby enabling the second predictive model to execute at least some of the database management system instructions to generate a prediction.

For example, an interchange tool identifies a visual workflow of data transformations for a trained stock market price prediction model that executes on a training server. The interchange tool parses the visual workflow of data transformations. The interchange tool generates SQL code that corresponds to the parsed visual workflow of data transformations. The interchange tool exports the generated SQL code to a real-time stock market price prediction model that executes on a desktop computer, thereby enabling the real-time stock market price prediction model to execute the exported SQL code to generate real-time predictions for Acme Corporation's stock price based on streaming stock market price data.

FIG. 1 illustrates a block diagram of an example system 100 for platform-agnostic predictive models based on database management system instructions, under an embodiment. As shown in FIG. 1, the system 100 may illustrate a cloud computing environment in which data, applications, services, and other resources are stored and delivered through shared data-centers and appear as a single point of access for the end users. The system 100 may also represent any other type of distributed computer network environment in which servers control the storage and distribution of resources and services for different client users.

In an embodiment, the system 100 represents a cloud computing system that includes a first client 102, a second client 104, a third client 106, a fourth client 108; and a server 110 that may be provided by a hosting company. The clients 102-108 and the server 110 communicate via a network 112. The server 110, which may be referred to as the training server 110, includes and executes a first predictive model 114, which may be referred to as the training predictive model 114, the trained predictive model 114, or the trained stock market price prediction model 114. The fourth client 108, which may be referred to as the production client 108, can include and execute a second predictive model 116, which may be referred to as the production predictive model 116 or the real-time stock market price prediction model 116. The training server 110 uses the first data source 118 to train the trained predictive model 114. The production client 108 can execute the second predictive model 116 based on a second data source 120, which may be referred to the internal data source 120, and/or a third data source 122, which may be referred to the external data source 122. Although FIG. 1 depicts the fourth client 108 as the only client that has its own predictive model 116 or internal data source 120, any and/or all of the clients 102-108 can have its own predictive model and/or internal data source.

Even though FIG. 1 depicts the first client 102 as a smartphone 102, the second client 104 as a tablet computer 104, the third client 106 as a laptop computer 106, the fourth client 108 as a personal computer 108, and the server 110 as a server 110, each of the system components 102-110 may be any type of computer system. The system elements 102-110 may each be substantially similar to the hardware device 300 depicted in FIG. 3 and described below. While FIG. 1 depicts the system 100 with four clients 102-108, one server 110, one network 112, two predictive models 114-116, and three data sources 118-122, the system 100 may include any number of clients 102-108, any number of servers 110, any number of networks 112, any number of predictive models 114-116, and any number of data sources 118-122. FIG. 1 depicts an interchange tool 124 residing on the server 110, but the interchange tool 124 may reside fully and/or partially on any or all of the system elements 102-110.

After a data scientist creates a representation of data transformations associated with a first predictive model that executes on a first computing platform, the system 100 identifies the representation of data transformations. For example, and without limitation, this may include the interchange tool 124 identifying a visual workflow that encodes the end-to-end data transformations for the trained stock market price prediction model 114, which executes on the training server 110, including the pre-processing data transformations, the prediction model 114's data transformations, and the post-processing data transformations. A representation can be a description of something. A data transformation can be a change in the form or appearance of information, for example a reordering of data elements, or an arithmetic operation applied to certain fields.

Having identified the representation of data transformations, the system 100 parses the representation of data transformations. By way of example and without limitation, this may include the interchange tool 124 parsing the visual workflow of data transformations for the trained stock market price prediction model 114. The method via which the predictive model's representation of the data transformation sequence was created will determine how the interchange tool 124 parses the representations of these data transformations to generate the corresponding sequence of SQL code. A data scientist can create a predictive model's representation of data transformations via the visual development engine that runs the visual workflows, a SQL script, a higher-level language script (such as Python) that generates SQL code when invoked, or some other method. The interchange tool 124 parses the representations of the data transformation sequences using a variety of techniques, which include static parsing, function enhancement, and dynamic capture.

Static parsing can occur when a data scientist provides the predictive analytics software with a SQL script, or code fragments that generate SQL when invoked, and the interchange tool 124 synthesizes the predictive model's data transformation sequence, be it coded directly in SQL, or at a higher-level abstraction, such as a visual workflow or Python code. This approach can introduce additional complexity as it is necessary for the interchange tool 124 to handle the lexicon of the wide variety of toolchains used to generate SQL code. Therefore, parsing the representation of data transformations may include static parsing of the representation of data transformations when the first predictive model lacks a current execution status. For example, the interchange tool 124 parses the visual workflow of data transformations while the trained stock market price prediction model 114 is not currently being executed on the training server 110. A current execution status can be the condition of performing computer instructions at the present time.

Function enhancement is based on enhancing each function that a data scientist's predictive analytics framework supports to emit a SQL representation of the requested function. While this enhancement involves modifying each function, many predictive analytics frameworks have been designed to optionally generate a SQL output, such that this enhancement is a simple modification. Consequently, parsing the representation of data transformations may include modifying the predictive analytics framework to emit database management system instructions that correspond to the representation of data transformations in response to receiving requests for functions that correspond to the representation of data transformations. For example, the interchange tool 124 and/or a data scientist modify the predictive analytics framework for the training server 110 to emit SQL code that corresponds to the visual workflow of data transformations for the trained stock market price prediction model 114 whenever the predictive analytics framework receives requests from the data scientist for functions for the data transformations of the trained stock market price prediction model 114. A predictive analytics framework can be the basic support system underlying statistical techniques. A function can be a relationship or expression involving at least one variable.

Since many predictive analytics frameworks may be executed directly against a source database, in these cases the interchange tool 124 and/or a data scientist can execute the predictive model's code, and intercept, or dynamically capture, the sequence of SQL code that is generated by the predictive analytics framework and sent to the data source for execution. In many instances, adding support to export, retain, and/or log this SQL code is a simple enhancement to an existing predictive analytics framework. Thus, parsing the representation of data transformations may include dynamically recording database management system instructions that are generated in response to a predictive model implementing the representation of data transformations. For example, the interchange tool 124 and/or a data scientist activates the trained stock market price prediction model 114, and dynamically records the sequence of SQL code that is generated by the predictive analytics framework and sent to the first data source 118 for execution.

After parsing a representation of data transformations, the system 100 generates database management system instructions that correspond to the parsed representation of data transformations. In embodiments, this may include the interchange tool 124 generating SQL code that corresponds to the parsed visual workflow of data transformations for the trained stock market price prediction model 114. The parsed sequence of SQL code is an accurate representation of a predictive model's sequence of data transformations, including the pre-processing data transformations, the predictive model's data transformations, and the post-processing data transformations, and may be utilized to replay the sequence of transformations required to transform data —not only by the predictive model itself, but by all of the associated pre-processing of data and post-processing of data. In its most raw form, this sequence of the predictive model's data transformations may be exported to other predictive models that access other data sources that support SQL. However, there are some enhancements that may be undertaken to maximize the performance, robustness, and portability of the generated sequence of SQL code. While not required for correctness, optimization may be beneficial, which requires examining the generated sequence of SQL code, and optimizing the SQL code as appropriate. In many cases, especially when intercepting the SQL code dynamically, redundant or repeated SQL code may be captured and may be subsequently removed in an optimization pass across the SQL code. Therefore, generating the database management system instructions that correspond to the parsed representation of data transformations may include deleting some of the database management system instructions to optimize the database management system instructions. For example, the interchange tool 124 deletes the redundant SQL code when generating SQL code that corresponds to the parsed visual workflow of data transformations for the trained stock market price prediction model 114. Database management system instructions can be executable computer code that enable a computer software application which interacts with a computer user and other applications to capture and analyze organized information. A parsed representation can be something's description that has been analyzed and divided into its parts, with their syntactic roles further described.

Once the SQL code is parsed and extracted, it may be necessary for the interchange tool 124 to identify the dataset references and tag and expose these references as appropriate, so that it is clear to the user of the SQL code how to provide input data for the predictive model—i.e. how many inputs, in what order, and with what structure. The simplest sequences of data transformations are those with a single input. This is then the point at which the interchange tool 124 injects the raw data to be transformed into the predictive model's sequence of data transformations. For sequences that involves other data sets via joins, it may be necessary for the interchange tool 124 to document the dependency when the SQL code is deployed. For example, since system users have the option to request stock market price predictions that are partially based on social media sentiment, the interchange tool 124 generates SQL code that joins streaming stock market price data with streaming social media data. If a join accesses a static (static for the life of the predictive model) lookup table, the interchange tool 124 can incorporate this static table into a SQL sequence file and inject this incorporated static table into the platform-agnostic predictive model the first time that the generated SQL code is executed. An example of a static join is adding a table of state names and state codes ("Arizona", "AZ"; "California", "CA"; etc.) The interchange tool 124 can enhance the SQL sequence file with checks to enforce schema correctness of incoming data and reference tables, which ensures that the predictive model's sequence of data transformations is correctly deployed and connected. Consequently, generating the database management system instructions that correspond to the parsed representation of data transformations may include identifying data upon which other data depends, and injecting the data upon which the other data depends into the database management system instructions. The interchange tool 124 may need to pre-process the data to be joined. For example, the interchange tool 124 generates SQL code that corrects the spelling and recognizes capital letters in tweets, such that tweets referring to "Acme" are analyzed for social media sentiment regarding Acme Corporation's stock prices, while tweets that refer to the noun "acme" or the words "ace me" are not analyzed for social media sentiment. Data can be the quantities, characters, or symbols on which operations are performed by a computer, being stored and transmitted in the form of electrical signals, and recorded on magnetic, optical, or mechanical recording media.

The interchange tool 124 can create standalone platform-agnostic predictive models and deploy the trained predictive model's sequence of data transformations across any SQL substrate. A platform-agnostic predictive model can contain an embedded database or be configured to connect to a database instance. The database may be readily fronted by logic to expose the desired interface, be that a restful interface or a data stream consumer. The frontend of a platform-agnostic predictive model is responsible for receiving incoming data, persisting into the database, invoking the platform-agnostic predictive model's sequence of data transformations, retrieving the results, and returning the results as appropriate.

Thus, following the generation of database management system instructions, the system 100 sends the database management system instructions to a second predictive model that executes on a second computing platform, thereby enabling the second predictive model to execute at least some of the database management system instructions to generate a prediction. For example and without limitation, this may include the interchange tool 124 exporting the generated SQL code to the real-time stock market price prediction model 116 that executes on the desktop computer 108, thereby enabling the real-time stock market price prediction model 116 to execute the exported SQL code to generate real-time predictions for Acme Corporation's stock price based on streaming stock market price data in response to a user of the desktop computer requesting the predictions for Acme Corporation's stock price. A prediction can be an estimate of a consequence for something.

Figure 2:
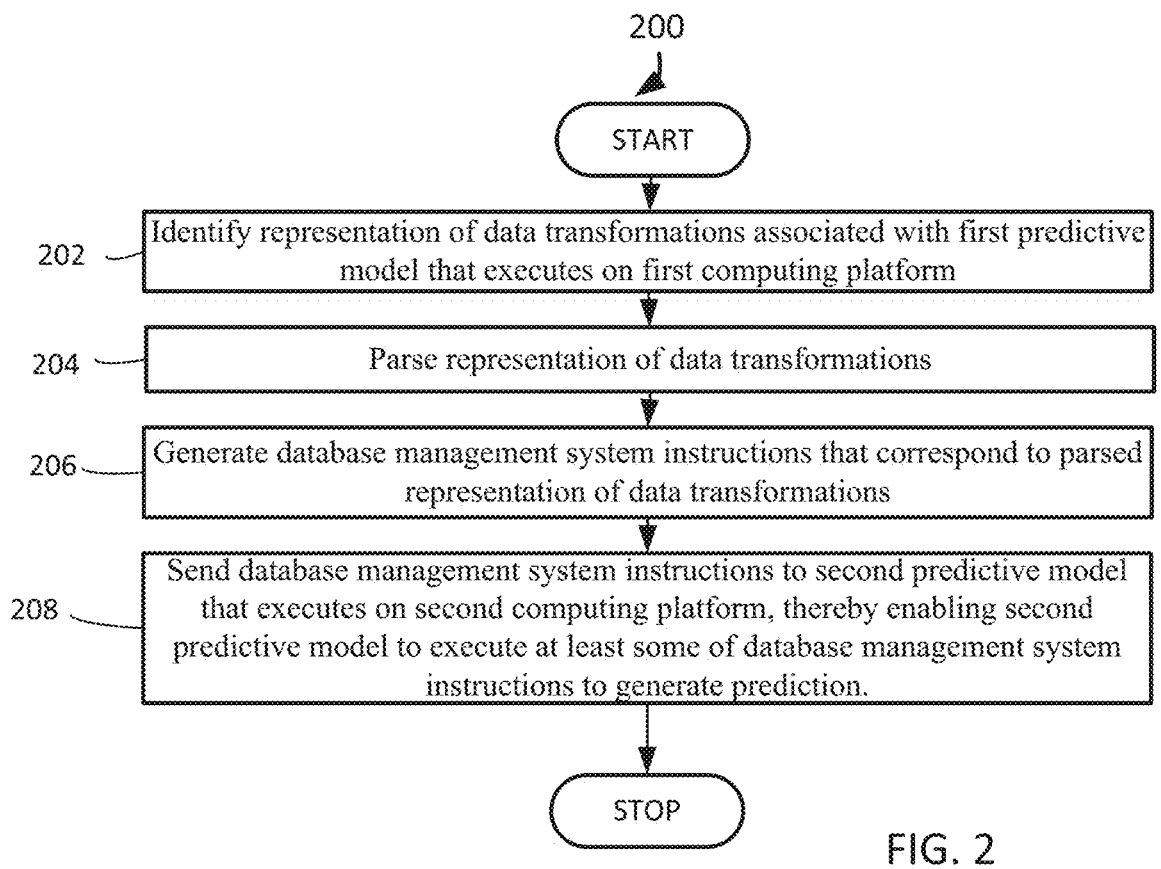
FIG. 2 is a flowchart that illustrates a computer-implemented method for platform-agnostic predictive models based on database management system instructions, under an embodiment.

FIG. 2 is a flowchart that illustrates a computer-implemented method for platform-agnostic predictive models based on database management system instructions, under an embodiment. Flowchart 200 illustrates method acts illustrated as flowchart blocks for certain actions involved in and/or between the system elements 102-110 of FIG. 1.

A representation of data transformations associated with a first predictive model that executes on a first computing platform is identified, block 202. The system 100 identifies a file of a predictive model's data transformations that are to be exported to another predictive model executing on a different type of computing platform. For example, and without limitation, this may include the interchange tool 124 identifying a visual workflow of data transformations for the trained stock market price prediction model 114 that executes on the training server 110.

Having identified a representation of data transformations, the representation of data transformations is parsed, block 204. The system 100 identifies a predictive model's data transformations that are to be exported to another predictive model executing on a different type of computing platform. By way of example and without limitation, this may include the interchange tool 124 parsing the visual workflow of data transformations for the trained stock market price prediction model 114.

After parsing a representation of data transformations, database management system instructions that correspond to the parsed representation of data transformations are generated, block 206. The system 100 generates code for a predictive model's data transformations that are to be exported to another predictive model executing on a different type of computing platform. In embodiments, this may include the interchange tool 124 generating SQL code that corresponds to the parsed visual workflow of data transformations for the trained stock market price prediction model 114.

Following the generation of database management system instructions, the database management system instructions are sent to a second predictive model that executes on a second computing platform, thereby enabling the second predictive model to execute at least some of the database management system instructions to generate a prediction, block 208. The system 100 exports a predictive model's data transformations to another predictive model executing on a different type of computing platform. For example and without limitation, this may include the interchange tool 124 exporting the generated SQL code to the real-time stock market price prediction model 116 that executes on the desktop computer 108, thereby enabling the real-time stock market price prediction model 116 to execute the exported SQL code to generate real-time predictions for Acme Corporation's stock price based on streaming stock market price data.

Although FIG. 2 depicts the blocks 202-208 occurring in a specific order, the blocks 202-208 may occur in another order. In other implementations, each of the blocks 202-208 may also be executed in combination with other blocks and/or some blocks may be divided into a different set of blocks.

Figure 3:
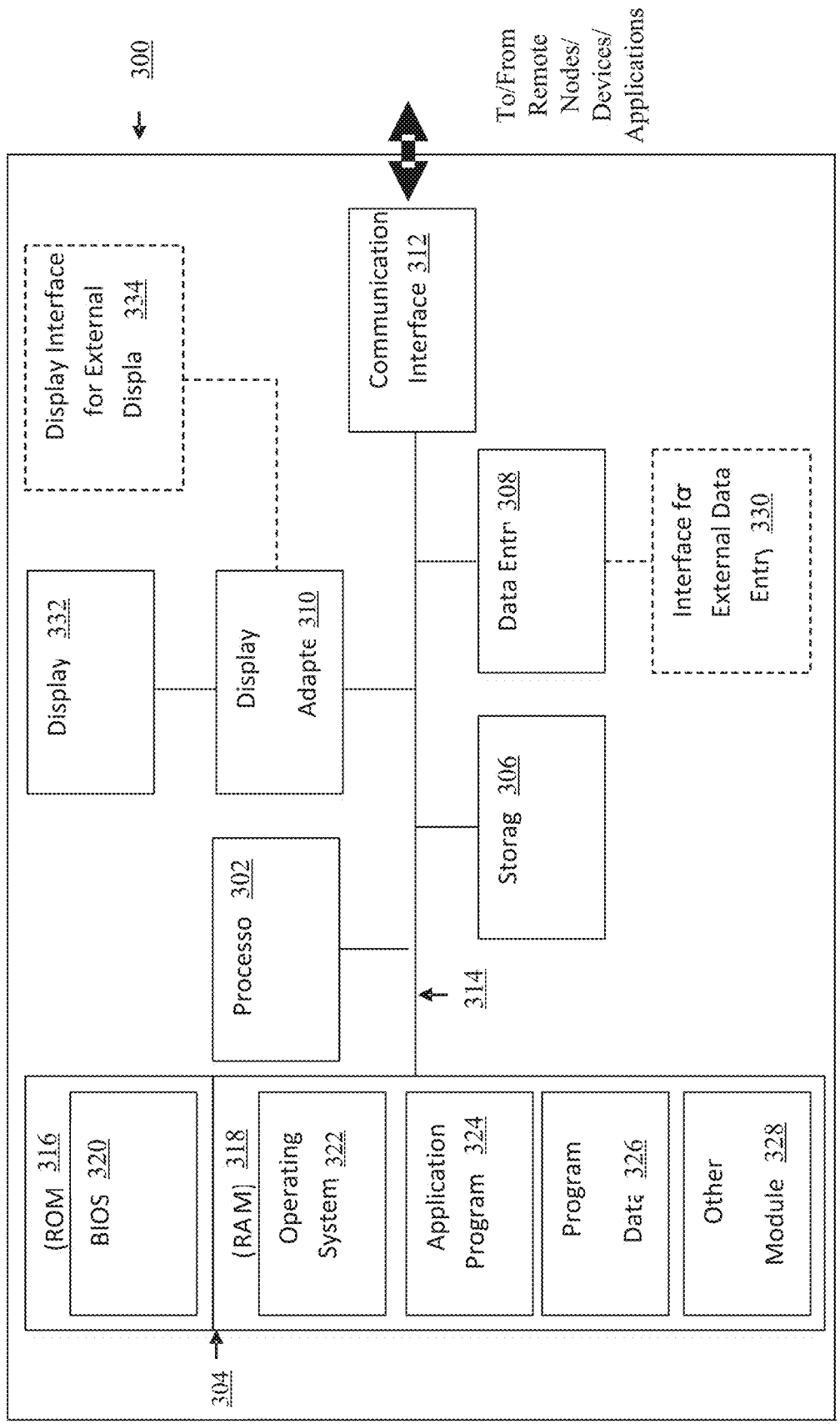
FIG. 3 is a block diagram illustrating an example hardware device in which the subject matter may be implemented.

An exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, a memory 304, a storage 306, a data entry module 308, a display adapter 310, a communication interface 312, and a bus 314 that couples elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include a read only memory (ROM) 316 and a random access memory (RAM) 318. The memory 304 may be configured to store program instructions and data during operation of the hardware device 300. In various embodiments, the memory 304 may include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which may store data that is accessible by a computer, such as magnetic cassettes, flash memory cards, digital video disks, Bernoulli cartridges, RAM, ROM, and the like may also be used in the exemplary operating environment. As used here, a "computer-readable medium" may include one or more of any suitable media for storing the executable instructions of a computer program in one or more of an electronic, magnetic, optical, and electromagnetic format, such that the instruction execution machine, system, apparatus, or device may read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through data entry module 308. The data entry module 308 may include mechanisms such as a keyboard, a touch screen, a pointing device, etc. Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via the external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the descriptions above, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in a context, it is not meant to be limiting as those of skill in the art will appreciate that various of the acts and operations described hereinafter may also be implemented in hardware.

To facilitate an understanding of the subject matter described above, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system comprising:
one or more processors; and
a non-transitory computer readable medium storing a plurality of instructions, which when executed, cause the one or more processors to:
identify a representation of data transformations associated with a first predictive model that executes on a first computing platform, wherein the representation defines sequences of transformations performed on data before, during, and after application of the first predictive model;
parse the representation of data transformations;
generate database management system instructions that correspond to the parsed representation of data transformations; and
send the database management system instructions to a second predictive model that executes on a second computing platform, thereby enabling the second predictive model to execute at least some of the database management system instructions to generate a prediction, wherein the first computing platform and the second computing platform are different types of computing platforms;
wherein the parsed representation of data transformations includes pre-processing data transformations, the first predictive model's data transformation, and post-processing data transformations that can be utilized by the second predictive model to replay the sequence of transformations needed to transform data;
wherein the database management system instructions enable platform-agnostic predictive models;
wherein parsing the representation of data transformations comprises modifying a predictive analytics framework to emit database management system instructions that correspond to the representation of data transformations in response to receiving requests for functions that correspond to the representation of data transformations.

2. The system of claim 1, wherein parsing the representation of data transformations comprises parsing the representation of data transformations when the first predictive model lacks a current execution status.

3. The system of claim 1, wherein parsing the representation of data transformations comprises dynamically recording database management system instructions that are generated in response to the first predictive model implementing the representation of data transformations.

4. The system of claim 1, wherein generating the database management system instructions that correspond to the parsed representation of data transformations comprises deleting some of the database management system instructions to optimize the database management system instructions, wherein some of the database management system instructions deleted include instructions associated with a structured query language.

5. The system of claim 1, wherein generating the database management system instructions that correspond to the parsed representation of data transformations comprises identifying data upon which other data depends, and injecting the data upon which the other data depends into the database management system instructions.

6. The system of claim 1, wherein the database management system instructions that correspond to the parsed representation of data transformations comprises code associated with a structured query language.

7. A method comprising:
identifying a representation of data transformations associated with a first predictive model that executes on a first computing platform, wherein the representation defines sequences of transformations performed on data before, during, and after application of the first predictive model;

parsing the representation of data transformations;

generating database management system instructions that correspond to the parsed representation of data transformations; and sending the database management system instructions to a second predictive model that executes on a second computing platform, thereby enabling the second predictive model to execute at least some of the database management system instructions to generate a prediction, wherein the first computing platform and the second computing platform are different types of computing platforms;

wherein the parsed representation of data transformations includes pre-processing data transformations, the first predictive model's data transformation, and post-processing data transformations that can be utilized by the second predictive model to replay the sequence of transformations needed to transform data;

wherein the database management system instructions enable platform-agnostic predictive models;

wherein parsing the representation of data transformations comprises modifying a predictive analytics framework to emit database management system instructions that correspond to the representation of data transformations in response to receiving requests for functions that correspond to the representation of data transformations.

8. The computer-implemented method of claim 7, wherein parsing the representation of data transformations comprises parsing the representation of data transformations when the first predictive model lacks a current execution status.

9. The computer-implemented method of claim 7, wherein parsing the representation of data transformations comprises dynamically recording database management system instructions that are generated in response to the first predictive model implementing the representation of data transformations.

10. The computer-implemented method of claim 7, wherein generating the database management system instructions that correspond to the parsed representation of data transformations comprises deleting some of the database management system instructions to optimize the database management system instructions, wherein some of the database management system instructions deleted include instructions associated with a structured query language.

11. The computer-implemented method of claim 7, wherein generating the database management system instructions that correspond to the parsed representation of data transformations comprises identifying data upon which other data depends, and injecting the data upon which the other data depends into the database management system instructions.

12. The computer-implemented method of claim 7, wherein the database management system instructions that correspond to the parsed representation of data transformations comprises code associated with a structured query language.

13. A computer program product, comprising a non-transitory computer-readable medium having a computer-readable program code embodied therein to be executed by one or more processors, the program code including instructions to:

identify a representation of data transformations associated with a first predictive model that executes on a first computing platform, wherein the representation defines sequences of transformations performed on data before, during, and after application of the first predictive model;

parse the representation of data transformations;

generate database management system instructions that correspond to the parsed representation of data transformations; and send the database management system instructions to a second predictive model that executes on a second computing platform, thereby enabling the second predictive model to execute at least some of the database management system instructions to generate a prediction, wherein the first computing platform and the second computing platform are different types of computing platforms;

wherein the parsed representation of data transformations includes pre-processing data transformations, the first predictive model's data transformation, and post-processing data transformations that can be utilized by the second predictive model to replay the sequence of transformations needed to transform data;

wherein the database management system instructions enable platform-agnostic predictive models;

wherein parsing the representation of data transformations comprises modifying a predictive analytics framework to emit database management system instructions that correspond to the representation of data transformations in response to receiving requests for functions that correspond to the representation of data transformations.

14. The computer program product of claim 13, wherein parsing the representation of data transformations comprises parsing the representation of data transformations when the first predictive model lacks a current execution status.

15. The computer program product of claim 13, wherein parsing the representation of data transformations comprises dynamically recording database management system instructions that are generated in response to the first predictive model implementing the representation of data transformations.

16. The computer program product of claim 13, wherein generating the database management system instructions that correspond to the parsed representation of data transformations comprises deleting some of the database management system instructions to optimize the database management system instructions, wherein some of the database management system instructions deleted include instructions associated with a structured query language.

17. The computer program product of claim 13, wherein generating the database management system instructions that correspond to the parsed representation of data transformations comprises identifying data upon which other data depends, and injecting the data upon which the other data depends into the database management system instructions, and the database management system instructions that correspond to the parsed representation of data transformations comprises code associated with a structured query language.

* * * * *